United States Patent
Kim

[11] Patent Number: 5,635,986
[45] Date of Patent: Jun. 3, 1997

[54] METHOD FOR ENCODING A CONTOUR OF AN OBJECT IN A VIDEO SIGNAL BY USING A CONTOUR MOTION ESTIMATION TECHNIQUE

[75] Inventor: Jin-Hun Kim, Seoul, Rep. of Korea

[73] Assignee: Daewoo Electronics Co., Ltd, Seoul, Rep. of Korea

[21] Appl. No.: 672,165

[22] Filed: Jun. 27, 1996

[30] Foreign Application Priority Data

Apr. 9, 1996 [KR] Rep. of Korea ............ 96-10633

[51] Int. Cl.$^6$ ............................................. H04N 7/36
[52] U.S. Cl. ............................ 348/416; 348/420; 382/242
[58] Field of Search .................................. 348/390, 400, 348/401, 402, 409, 412, 413, 415, 416, 420, 699; 382/236, 238, 241, 242, 250, 199

[56] References Cited

U.S. PATENT DOCUMENTS

| | | | |
|---|---|---|---|
| 4,748,675 | 5/1988 | Suzuki et al. | 382/241 |
| 5,054,103 | 10/1991 | Yasuda et al. | 382/250 |
| 5,295,201 | 3/1994 | Yokohama | 348/416 |
| 5,510,838 | 4/1996 | Yomdin et al. | 348/390 |
| 5,524,064 | 6/1996 | Oddou et al. | 382/242 |

*Primary Examiner*—Amelia Au
*Attorney, Agent, or Firm*—Anderson Kill & Olick P.C.

[57] ABSTRACT

A method for encoding a contour of an object predicts a current contour by using a current and a reconstructed previous contours and generates the motion vector representing a displacement between the reconstructed previous and the predicted current contours. A matched contour between the predicted current and the current contours is subtracted from the current contour to provide a differential contour. Thereafter, vertex points is determined based on a polygonal approximation for the differential contour. A set of approximation errors calculated at a predetermined number of sample points on each line segment between two vertex points is transformed and quantized to obtain a set of quantized discrete sine transform coefficients. The quantized discrete sine transform coefficients are encoded together with the motion vector, and the vertex points are encoded based on the predicted current contour for transmission thereof. And, the coded vertex information is decoded based on the predicted current contour, and the quantized discrete sine transform coefficients are converted into the reconstructed errors to reconstruct the differential contour. The reconstructed differential contour is added to the matched contour to provide the reconstructed previous contour.

2 Claims, 5 Drawing Sheets

METHOD FOR ENCODING A CONTOUR OF AN OBJECT IN A VIDEO SIGNAL BY USING A CONTOUR MOTION ESTIMATION TECHNIQUE

FIELD OF THE INVENTION

The present invention relates to a method for encoding a video signal; and, more particularly, to a method capable of effectively encoding a contour of an object contained in a video signal, thereby reducing the amount of data to be transmitted.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of the digital data therethrough, it is inevitable to compress or reduce the volume of data through the use of various data compression techniques, especially, in the case of such low bit-rate video signal encoders as video-telephone and teleconference system.

One of such techniques for encoding video signals for a low bit-rate encoding system is the so-called object-oriented analysis-synthesis coding technique (see Michael Hötter, "Object-Oriented Analysis-Synthesis Coding Based on Moving Two-Dimensional Objects", *Signal Processing: Image Communication* 2, 409–428 (December, 1990)).

According to the object-oriented analysis-synthesis coding technique, an input video image is divided into objects; and three sets of parameters for defining the motion, contour and pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although there is no loss in the contour information.

To overcome the drawback, therefore, there have been proposed several methods to encode the contour information such as a polygonal approximation and a B-spline approximation. One of the disadvantages in the polygonal approximation is the roughness of the representation of the contour. The B-spline approximation is, on the other hand, capable of representing the contour more precisely; however, it requires a high-order polynomial to reduce the approximation error. The B-spline approximation technique, however, results in an increased overall computational complexity of the video encoder.

One of the techniques introduced to ameliorate such problems associated with the rough representation of the contour and the increased computational complexity in the above approximation approaches is a contour approximation technique employing a discrete sine transform (DST).

In an apparatus which adopts the contour approximation technique based on the polygonal approximation and the DST, as disclosed in a commonly owned copending application, U.S. Ser. No. 08/423,604, entitled "A CONTOUR APPROXIMATION APPARATUS FOR REPRESENTING A CONTOUR OF AN OBJECT", a number of vertex points are determined and the contour of an object is approximated through the use of polygonal approximation for fitting the contour by line segments. And, N sample points for each line segment are selected and an approximation error at each of the N sample points located on each line segment is sequentially calculated in order to obtain a set of approximation errors for each line segment. The N sample points are equi-distanced on each line segment and each of the approximation errors represents the distance between each of the N sample points and the contour. Thereafter, sets of DST coefficients are generated by performing a one-dimensional DST operation on each set of approximation errors.

Even though it is possible to remedy the rough representation and computational complexity, and somewhat reduce the volume of transmission data through the use of the aforementioned DST based contour approximation, it still remains desirable to further reduce the volume of transmission data in order to successfully implement a low-bit rate codec system having, e.g., a 64 kb/s transmission channel bandwidth.

SUMMARY OF THE INVENTION

It is, therefore, a primary object of the invention to provide an improved method for encoding a contour of an object in a video signal, which is capable of further reducing the amount of transmission data through the use of a contour motion estimation technique.

In accordance with the invention, there is provided a method for encoding a contour of an object expressed in a digital video signal, the digital video signal having a plurality of frames including a current frame and a previous frame, comprising the steps of: (a) detecting a boundary of the object within the current frame to generate a current contour, wherein the current contour provides current contour information for tracing the boundary of the object in the current frame, the current contour information including position data of the pixels along the boundary of the object; (b) storing a reconstructed previous contour, wherein the reconstructed previous contour provides reconstructed previous contour information for tracing the boundary of the object in the previous frame; (c) determining a motion vector by detecting a movement of the reconstructed previous contour that gives a best matching between the current and the reconstructed previous contours when the reconstructed previous contour is moved to overlap with the current contour, and generating the motion vector and a predicted current contour, wherein the motion vector represents a displacement between the reconstructed previous contour and the predicted current contour, the predicted current contour representing a contour shifted from the reconstructed previous contour by the motion vector; (d) overlapping the predicted current contour with the current contour to thereby provide a matched contour representing an overlapped contour portion therebetween; (e) generating a differential contour by subtracting the matched contour from the current contour, the differential contour denoting the differential contour portion between the current and the matched contours; (f) determining a number of vertex points on the differential contour; (g) providing a polygonal approximation of the differential contour by fitting the differential contour with a multiplicity of line segments, to thereby generate vertex information representing the positions of the vertex points of the differential contour, each of the line segments joining two neighboring vertex points; (h) providing N sample points for each of the line segments and calculating an error for each of the N sample points on each of the line segments to produce a set of errors for each of the line segments, wherein said N sample points are equidistanced on each of the line segments and each set of errors represents the distance between said each of the N sample points and the differential contour; (i) transforming the set of errors for each of the line segments into a set of discrete sine transform coefficients corresponding thereto; (j) converting the set of discrete sine transform coefficients into a set of quantized discrete sine transform coefficients corresponding thereto; (k) encoding the motion vector and the set of quantized discrete sine transform coefficients for each set of discrete sine transform coefficients; (l) encoding the vertex information based on the predicted current contour, to thereby provide encoded vertex information; (m) decoding the encoded vertex information based on the predicted current contour, thereby providing decoded vertex information; (n) converting the set of quantized discrete sine transform coefficients for each set of discrete sine transform coefficients into a set of reconstructed discrete sine transform coefficients; (o) converting the set of reconstructed discrete sine transform coefficients into a set of reconstructed errors for each of the line segments; (p) providing the reconstructed differential contour based on the decoded vertex information and the set of reconstructed errors; and (q) adding the matched contour to the reconstructed differential contour to thereby provide the added contour as the reconstructed previous contour.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
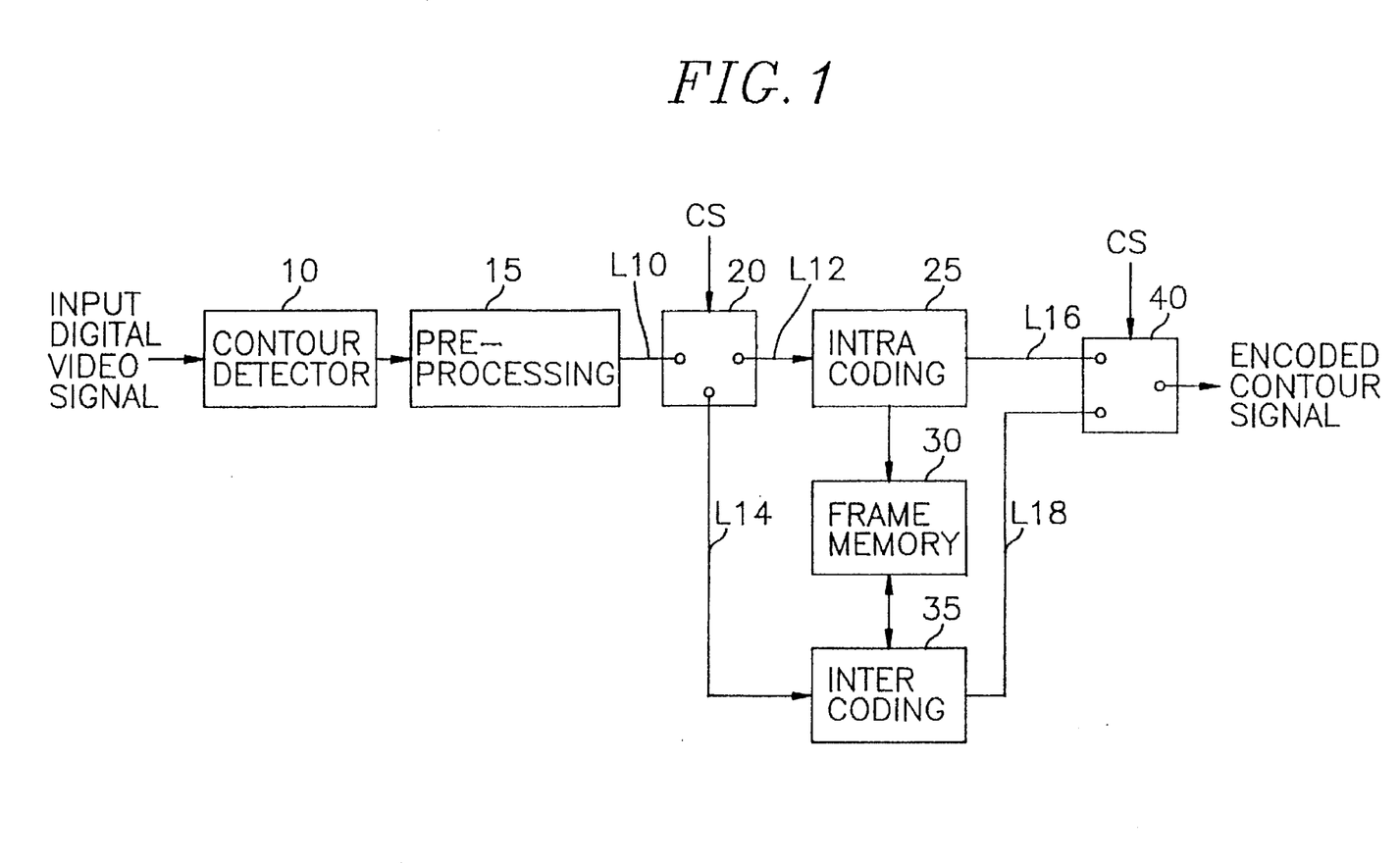
FIG. 1 depicts a schematic block diagram of the inventive apparatus for encoding a contour of an object.

Referring to FIG. 1, there is shown a schematic block diagram of the inventive apparatus for encoding a contour of an object expressed in a video signal. The contour encoding apparatus comprises two coding channels, i.e., intra-coding channel 25 and inter-coding channel 35, capable of selectively encoding the contour of the object in response to a channel selection signal CS of a logic high or a logic low produced by a system controller (not shown), wherein the intra-coding channel 25 employs a polygonal approximation and a discrete sine transform (DST) to encode the contour, and the inter-coding channel 35 encodes the contour by using a contour motion estimation technique together with the polygonal approximation and the DST.

As shown, an input digital video signal is fed, as a current frame signal, to a contour detector 10. The contour detector 10 detracts a boundary or contour of an object in a current frame and generates a current contour, wherein the current contour provides current contour information for tracing the boundary of the object in the current frame, the current contour information including position data of the pixels along the boundary of the object in the current frame. The current contour representing the contour of the object is inputted to a pre-processing block 15. The pre-processing block 15 removes a contour consisting of a few of pixels in order to improve a coding efficiency and exclude noise effect. The pre-processed current contour from the pre-processing block 15 is provided via a line L10 to a first switch 20 which serves to selectively provide the pre-processed current contour on the line L10 to the intra-coding channel 25 or inter-coding channel 35 in response to the CS. Specifically, the first switch 20 supplies the pre-processed current contour on the line L10 to the intra-coding channel 25 through a line L12 if the CS generated from the system controller is, e.g., a logic low; otherwise, it relays the pre-processed current contour to the inter-coding channel 35 through a line L14. The intra-coding channel 25 encodes the contour on the line L12 based on the polygonal approximation and the DST to thereby provide an encoded contour signal to a second switch 40 through a line L16; and also provides the reconstructed contour as a previous contour to a frame memory 30 for the storage thereof. Details of the intra-coding channel 25 will be described hereafter with reference to FIGS. 2, 4A to 4C, 5A and 5B.

In the meantime, at the inter-coding channel 35 of the present invention, a predicted current contour and a motion vector are generated by predicting the current contour based on the pre-processed current contour on the line L14 and the reconstructed previous contour retrieved from the frame memory 30, wherein the motion vector represents a spatial displacement between the reconstructed previous contour and the predicted current contour. By subtracting a matched contour portion from the pre-processed current contour, a differential contour is generated, wherein the matched contour portion represents an overlapped contour portion of the pre-processed current contour and the predicted current contour. Thereafter, the differential contour and the motion vector are encoded by using the polygonal approximation and the DST, thereby providing an encoded contour signal to the second switch 40 through a line L18; and also provides the reconstructed contour as the previous contour to the frame memory 30 for the storage thereof. The inter-coding channel 35 will be described in detail hereafter with reference to FIGS. 3 and 6. The second switch 40 selectively outputs the encoded contour signal from the intra-coding channel 25 or inter-coding channel 35 in response to the CS from the system controller (not shown).

Figure 2:
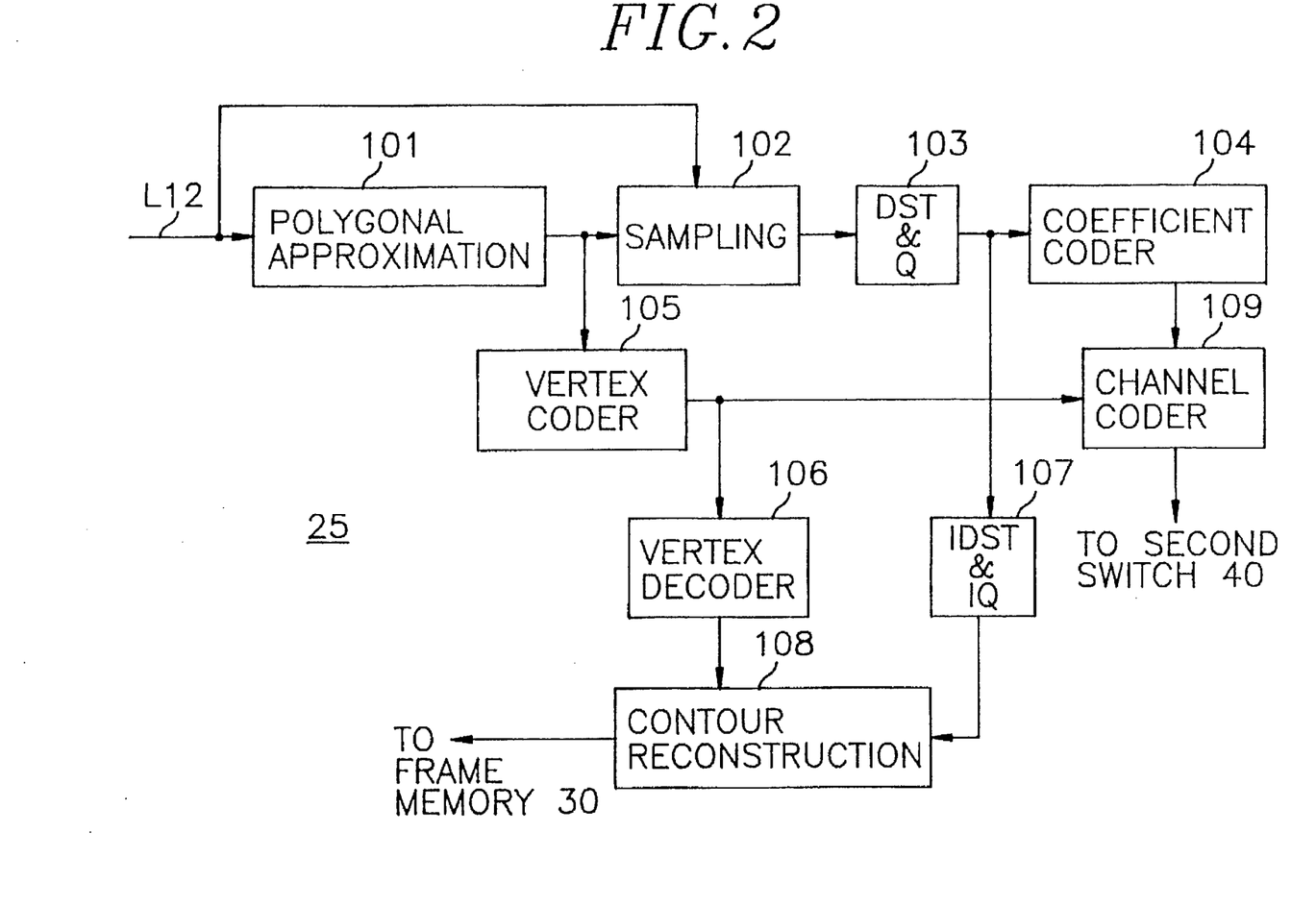
FIG. 2 presents a detailed block diagram of the intra-coding channel shown in FIG. 1.

Referring now to FIG. 2, there is illustrated a detailed block diagram of the intra-coding channel 25 shown in FIG. 1. The pre-processed current contour on the line L12 from the first switch 20 shown in FIG. 1 is inputted to a polygonal approximation block 101 and a sampling circuit 102.

At the polygonal approximation block 101, a pre-processed current contour is approximated by a polygonal approximation technique. The polygonal approximation of the object shape is achieved through the use of a conventional approximation algorithm for fitting the contour with a plurality of line segments.

Figure 4A:
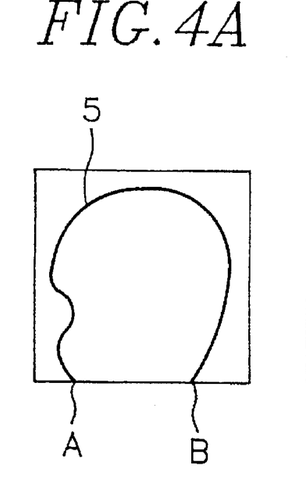
FIGS. 4A to 4C illustrate an exemplary polygonal approximation process of the contour of an object.
Figure 4B:
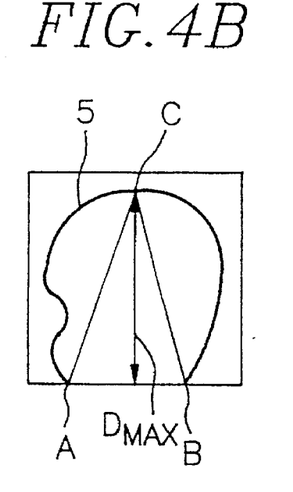
Figure 4C:
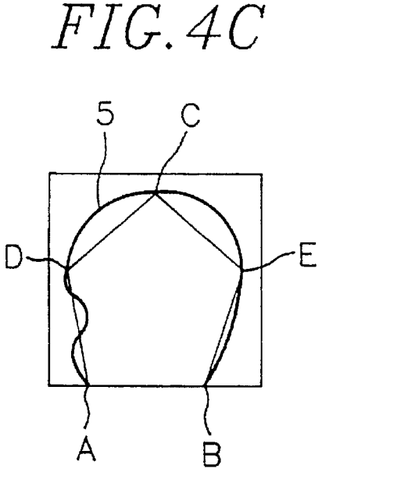

Referring to FIGS. 4A to 4C, there is illustrated a segmentation process for an exemplary pre-processed current contour 5 according to the polygonal approximation technique.

First, two starting vertex points are selected. If the pre-processed current contour is of an open loop, two end points, e.g., A and B as shown in FIG. 4A, are selected as the starting vertex points. On the other hand, if the pre-processed current contour is in the form of a closed loop, two from a line segment AB is determined. If the distance $D_{max}$ farthest points on the contour are selected as the starting vertex points. And then, the farthest point on the contour between the farthest point, e.g., C, and the line segment AB is greater than a predetermined threshold value, the point C becomes a vertex point. This procedure is repeated until the $D_{max}$ for each segment becomes smaller than the predetermined threshold value.

The number of vertex points depends on the predetermined threshold value. As can be seen from FIGS. 4A to 4C, the representation of the contour by line segments becomes more accurate as the predetermined threshold value becomes smaller, at the expense of coding efficiency.

Referring back to FIG. 2, vertex information representing the positions of the determined vertex points, e.g., A, B, C, D and E, of the pre-processed current contour 5 is provided from the polygonal approximation block 101 to the sampling circuit 102 and a vertex coder 105. The sampling circuit 102 selects N sample points for each line segment and calculates an approximation error at each of the N sample points on each line segment based on the vertex information and the pre-processed current contour data, wherein the N sample points are equi-distanced on each line segment between two vertex points with N being an integer. The approximation error represents the distance between a line segment joining two vertex points and the contour segment between the two vertex points.

Figure 5A:
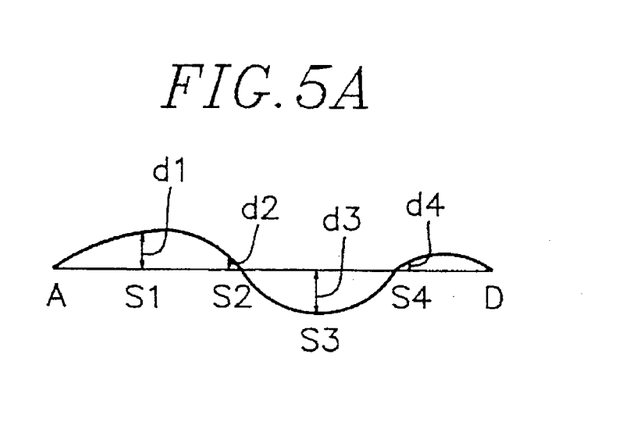
FIGS. 5A and 5B show exemplary diagrams, each representing errors between a line segment joining two vertex points and its corresponding contour segment.
Figure 5B:
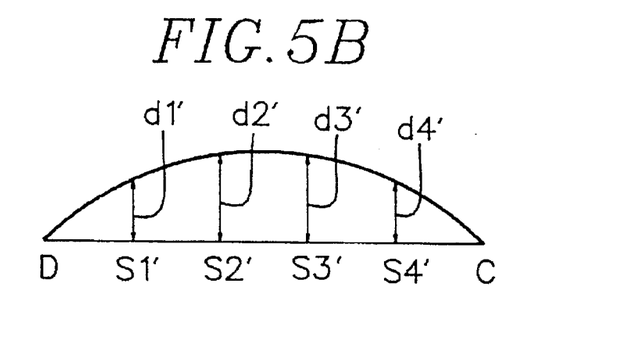

FIGS. 5A and 5B illustrate exemplary diagrams representing approximation errors between line segments and corresponding contour segments, wherein FIG. 5A depicts approximation errors between the line segment AD and its corresponding contour segment and FIG. 5B shows approximation errors between the line segment DC and its corresponding contour segment. Each of the errors d1 to d4 or d1' to d4' represents the distance from each sample point S1 to S4 on the line segment AD or S1' to S4' on the line segment DC to the corresponding contour segment. As can be seen in FIGS. 5A and 5B, the approximation errors for the vertex points are all "zeros", since all the vertex points are positioned on the contour.

The approximation errors calculated by the sampling circuit 102 are supplied to a DST & quantization (Q) block 103. The DST & Q block 103 performs one-dimensional DST operation on the set of the approximation errors for each of the line segments to produce a set of DST coefficients corresponding to each set of the approximation errors, the approximation errors for each set including errors for N sample points and two vertex points of each line segment; and quantizes each set of DST coefficients to provide a set of quantized DST coefficients corresponding to each set of DST coefficients to a coefficient coder 104 and an inverse discrete sine transform (IDST) and inverse quantization (IQ) block 107. At the coefficient coder 104, the quantized DST coefficients are encoded, e.g., by using a binary arithmetic code of JPEG (Joint Picture Experts Group), and the encoded quantized DST coefficients are then transmitted to a channel coder 109.

The vertex coder 105 encodes the vertex information representing the positions of the vertex points by using, e.g., a conventional syntax arithmetic code or the binary arithmetic code, and provides the coded vertex information to a vertex decoder 106 and the channel coder 109. The channel coder 109 encoders the coded vertex information together with the encoded quantized DST coefficients and provides an encoded contour signal comprising the coded vertex information and the encoded quantized DST coefficients to the second switch 40 shown in FIG. 1. The IDST & IQ block 107 performs IDST and IQ operations on each set of the encoded quantized DST coefficients to provide a set of reconstructed approximation errors for each line segment to a contour reconstruction block 108. The vertex decoder 106 decodes the coded vertex information from the vertex coder 105 to thereby provide the reconstructed vertex information to the contour reconstruction block 108. At the contour reconstruction block 108, the contour is reconstructed based on the reconstructed vertex information from the vertex decoder 106 and each set of the reconstructed approximation errors for each of the line segments from the IDST & IQ block 107. Thereafter, the reconstructed contour is stored as the previous contour in the frame memory 30 shown in FIG. 1.

Figure 3:
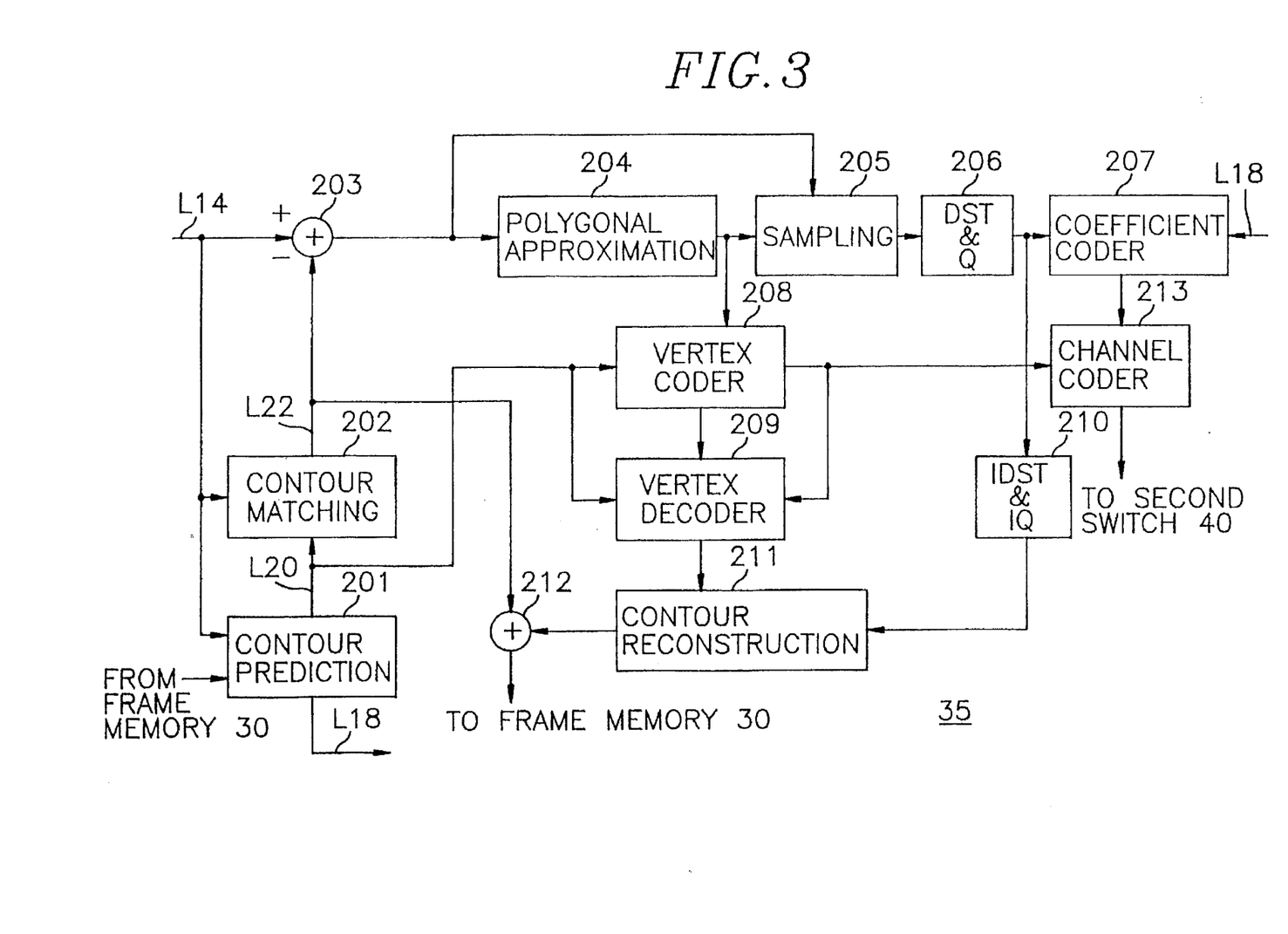
FIG. 3 represents a detailed block diagram of the inter coding-channel shown in FIG. 1.

FIG. 3 illustrates a detailed block diagram of the inter-coding channel 35 shown in FIG. 1, which incorporates a polygonal approximation block 204, a sampling circuit 205, a DST & Q block 206, a coefficient coder 207, a channel coder 213, an IDST & IQ block 210, and a contour reconstruction block 211 performing the same function as the corresponding elements contained in the intra-coding channel 25.

The pre-processed current contour on the line L14 from the first switch 20 shown in FIG. 1 is supplied to a contour prediction block 201, a contour matching block 202 and a subtractor 203. At the contour prediction block 201, the current contour and the reconstructed previous contour retrieved from the frame memory 30 shown in FIG. 1 are processed to predict the current contour, thereby generating the predicted current contour onto a line L20 and the motion vector representing the spatial displacement between the reconstructed previous contour and the predicted current contour onto a line L18. In a preferred embodiment of the present invention, the motion vector is determined by finding a movement of the reconstructed previous contour that gives best matching between the pre-processed current contour and the reconstructed previous contour when the reconstructed previous contour is moved to overlap with the pre-processed current contour, wherein the matching includes the case where the deviation between corresponding pixels is one pixel position.

The predicted current contour on the line L20 is overlapped with the pre-processed current contour on the line L14 at the contour matching block 202 and a matched contour representing an overlapped contour portion therebetween is generated onto a line L22. The matched contour on the line L22 is subtracted from the pre-processed current contour on the line L14 at the subtractor 203, and a differential contour denoting the differential contour portion between the pre-processed current contour and the matched contour is dispatched to the polygonal approximation block 204 and the sampling circuit 205.

At the polygonal approximation block 204, vertex points are determined by fitting the differential contour with a plurality of line segments. Thereafter, the vertex information representing the positions of the determined vertex points is provided to the sampling circuit 205 and a vertex coder 208 of the present invention. The sampling circuit 205 selects N sample points for each line segment and calculates an approximation error at each of the N sample points on each line segment based on the vertex information and the differential contour. The approximation errors calculated by the sampling circuit 205 are provided to the DST & Q block

206. The DST & Q block 206 performs the one-dimensional DST operation on the set of the approximation errors for each line segment to produce a set of DST coefficients corresponding to each set of the approximation errors; and quantizes each set of the DST coefficients to provide a set of quantized DST coefficients corresponding to each set of the DST coefficients to the coefficient coder 207 and the IDST & IQ block 210. At the coefficient coder 207, the quantized DST coefficients are encoded together with the motion vector on the line L18 from the contour prediction block 201, e.g., by using the binary arithmetic code. The encoded digital signal comprising the encoded quantized DST coefficients and the motion vector is transmitted from the coefficient coder 207 to the channel coder 213.

In accordance with the present invention, the vertex coder 208 encodes the vertex points selected from the polygonal approximation block 204 by using the displacement from pixel positions on the predicted current contour on the line L20 from the contour prediction block 201, or the displacement from the previously encoded vertex points.

Figure 6:
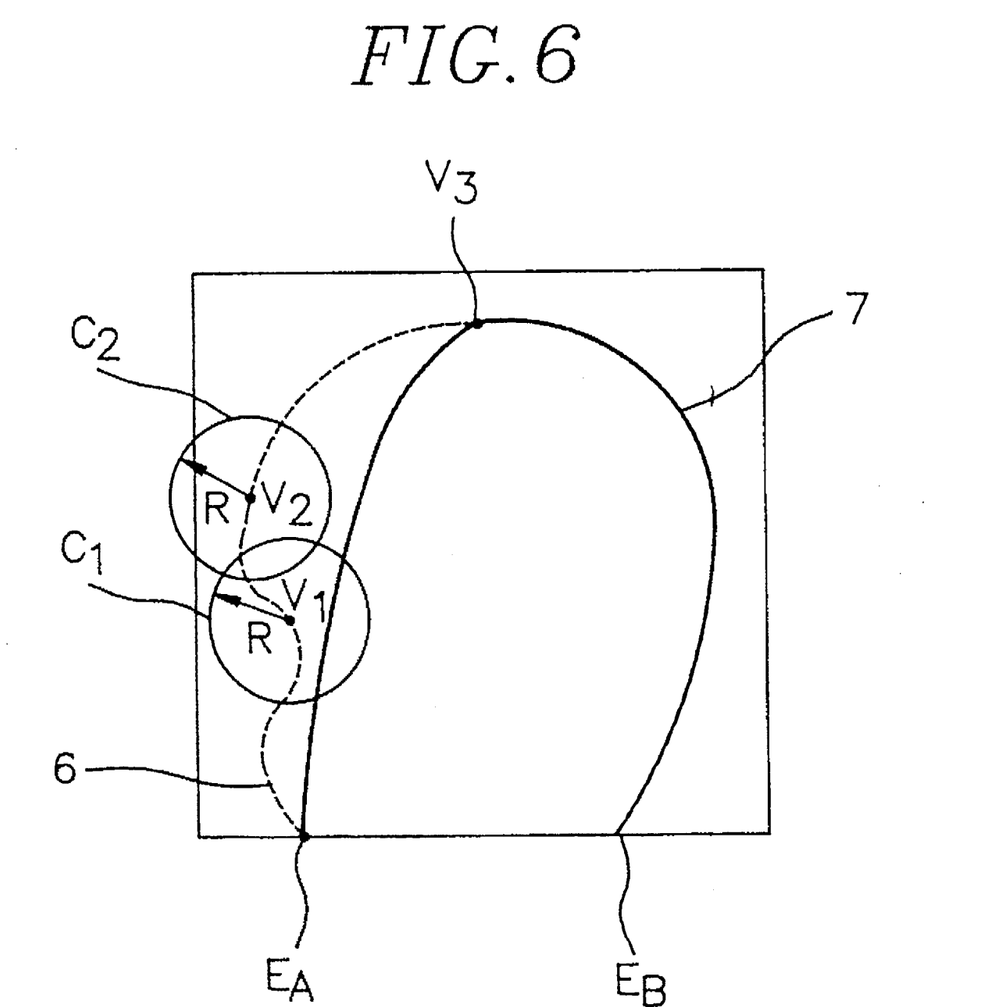
FIG. 6 provides an exemplary diagram for explaining a vertex coding scheme of the present invention.

Referring to FIG. 6, there is illustrated an exemplary diagram for explaining a vertex coding scheme according to the present invention.

First, an index is assigned to each pixel on the predicted current contour 7 starting from a selected pixel. If the predicted current contour is of an open loop, one of the two end points thereof, e.g., $E_A$ and $E_B$, which has a smaller x-component is selected as a starting point. In this example, $E_A$ is selected as the starting point. On the other hand, if the predicted current contour is in the form of a closed loop, a pixel having the smallest x-component on the contour is selected as the starting point. And then, the vertex points, e.g., $E_A$ and V1 to V3 obtained by performing the polygonal approximation for the differential contour 6 are encoded in accordance with the present invention.

If a circle having a predetermined radius R and a vertex point to be coded at the center thereof includes at least one pixel on the predicted current contour 7, a displacement between the vertex point and a closest pixel to the vertex point among the pixels included in the circle and the index corresponding to the closest pixel are encoded by using, e.g., the binary arithmetic code; otherwise, a displacement between a previously encoded vertex point and the vertex point is encoded.

For example, the vertex point $V_1$ is encoded by using an index corresponding to a closest pixel to V1 in the circle $C_1$ and a displacement therebetween since the circle $C_1$ having the predetermined radius R and the V1 at the center thereof includes pixels on the predicted current contour 7, while the vertex point $V_2$ is encoded by using a displacement between $V_2$ and the previously encoded vertex point, e.g., $V_1$ since non of the pixels on the predicted current contour 7 is contained in the circle $C_2$ having the predetermined radius R and the $V_2$ at the center thereof. The vertex points $E_A$ and $V_3$ being two end points of the differential contour 6 are encoded by using indexes corresponding thereto since they are located on the predicted current contour 7. The coded vertex information is provided from the vertex coder 208 to the channel coder 213 and the vertex decoder 209.

The channel coder 213 encodes the coded vertex information together with the encoded digital signal comprising the encoded quantized DST coefficients and the motion vector, end provides the encoded contour signal to the second switch 40 shown in FIG. 1. The IDST & IQ block 210 performs IDST and IQ operations on each set of the quantized DST coefficients to provide a set of reconstructed approximation errors for each line segment to the contour reconstruction block 211. The vertex decoder 209 generates reconstructed vertex information through the use of the predicted current contour on the line L20 from the contour prediction block 201. At the contour reconstruction block 211, the contour signal is reconstructed based on the reconstructed vertex information from the vertex decoder 209 and each set of the reconstructed approximation errors for each of the line segments from the IDST & IQ block 210. Thereafter, at an adder 212, the reconstructed contour is added to the matched contour on the line L22 from the contour matching block 202 to produce a reconstructed contour. The reconstructed contour is stored as the previous contour in the frame memory 30 shown in FIG. 1.

As demonstrated above, the present invention effectively encodes the contour of an object expressed in a video signal by using the contour motion estimation technique, thereby reducing the amount of data to be transmitted.

While the present invention has been described with respect to the particular embodiments, it will be apparent to those skilled in the art that various changes and modifications may be made without departing from the spirit and scope of the invention as defined in the following claims.

What is claimed is:

1. A method for encoding a contour of an object expressed in a digital video signal, said digital video signal having a plurality of frames including a current frame and a previous frame, comprising the steps of:

(a) detecting a boundary of the object within the current frame to generate a current contour, wherein the current contour provides current contour information for tracing the boundary of the object in the current frame, the current contour information including position data of the pixels along the boundary of the object;

(b) storing a reconstructed previous contour, wherein the reconstructed previous contour provides reconstructed previous contour information for tracing the boundary of the object in the previous frame;

(c) determining a motion vector by finding a movement of the reconstructed previous contour that gives a best match between the current and the reconstructed previous contours when the reconstructed previous contour is moved to overlap with the current contour, and generating the motion vector and a predicted current contour, wherein the motion vector represents a displacement between the reconstructed previous contour and the predicted current contour, the predicted current contour representing a contour shifted from the reconstructed previous contour by the motion vector;

(d) overlapping the predicted current contour with the current contour to thereby provide a matched contour representing an overlapped contour portion therebetween;

(e) generating a differential contour by subtracting the matched contour from the current contour, the differential contour denoting the differential contour portion between the current and the matched contours;

(f) determining a number of vertex points on the differential contour;

(g) providing a polygonal approximation of the differential contour by fitting the differential contour with a multiplicity of line segments, to thereby generate vertex information representing the positions of the vertex points of the differential contour, each of the line segments joining two neighboring vertex points;

(h) providing N sample points, wherein N is an integer, for each of the line segments and calculating an error for each of the N sample points on each of the line segments to produce a set of errors for each of the line segments, wherein said N sample points are equidistanced on each of the line segments and each set of errors represents the distance between said each of the N sample points and the differential contour;

(i) transforming the set of errors for each of the line segments into a set of discrete sine transform coefficients corresponding thereto;

(j) converting the set of the discrete sine transform coefficients into a set of quantized discrete sine transform coefficients corresponding thereto;

(k) encoding the motion vector and the set of quantized discrete sine transform coefficients for each set of discrete sine transform coefficients;

(l) encoding the vertex information based on the predicted current contour, to thereby provide encoded vertex information;

(m) decoding the encoded vertex information based on the predicted current contour, thereby providing decoded vertex information;

(n) converting the set of quantized discrete sine transform coefficients for each set of discrete sine transform coefficients into a set of reconstructed discrete sine transform coefficients;

(o) converting the set of reconstructed discrete sine transform coefficients into a set of reconstructed errors for said each of the line segments;

(p) providing the reconstructed differential contour based on the decoded vertex information and the set of reconstructed errors; and (q) adding the matched contour to the reconstructed differential contour to thereby provide the added contour as the reconstructed previous contour.

2. The method according to claim 1, wherein said step (l) includes:

(l1) assigning an index to each pixel on the predicted current contour starting from a selected pixel; and (l2) encoding a displacement between the previously encoded vertex point and the vertex point if none of the pixels on the predicted current contour is incorporated in a circle of radius R centered at the vertex point, otherwise, finding a closest pixel to the vertex point among the pixels included in the circle, and encoding the index corresponding to the closest pixel and the displacement between the vertex point and the closest pixel, R being a predetermined value.

* * * * *